Dec. 26, 1933.     L. HOTTO     1,941,306
FARM IMPLEMENT
Filed April 5, 1933     2 Sheets-Sheet 1

Inventor
Louis Hotto
By Geo. P. Kimmel
Attorney

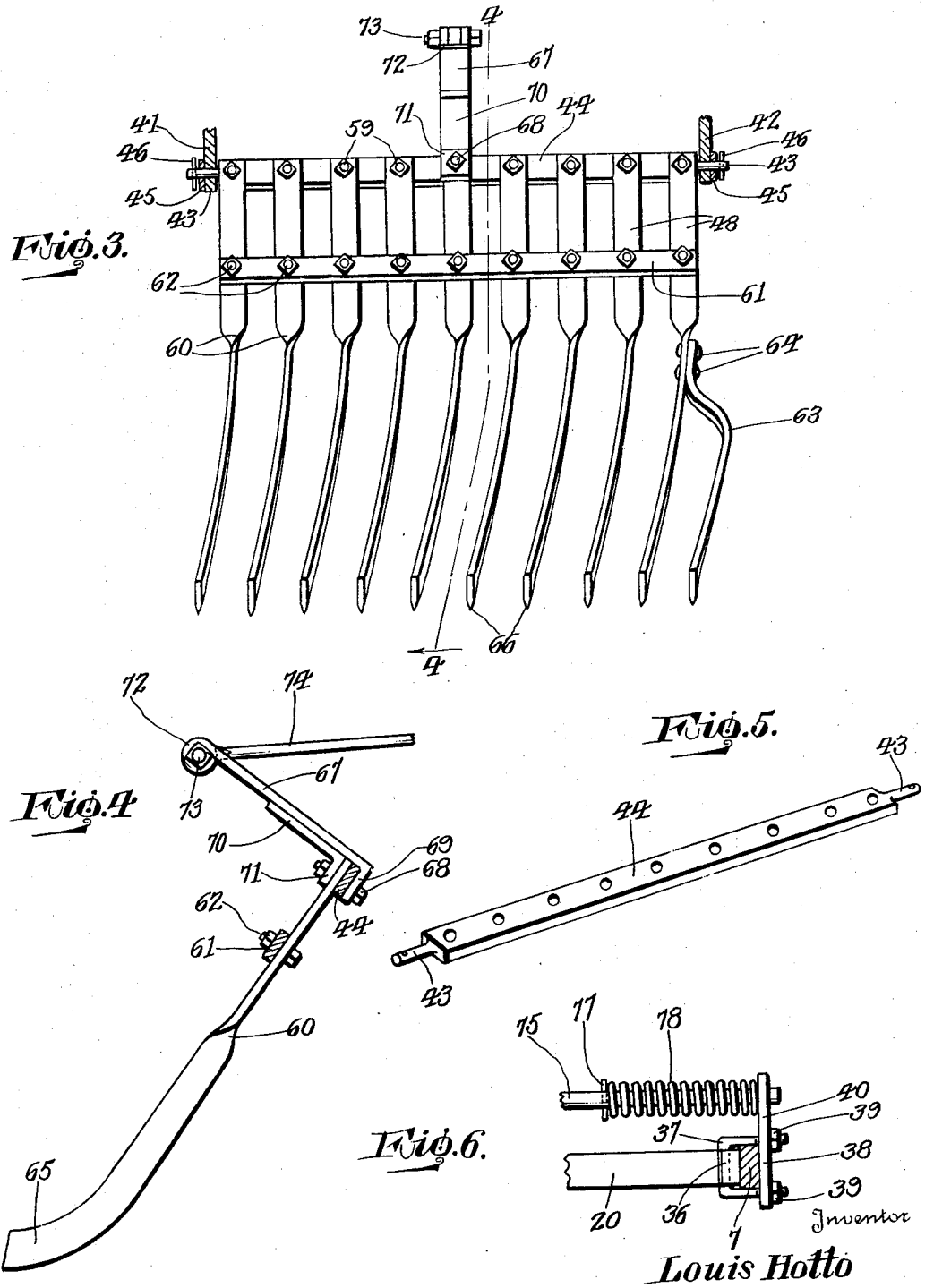

Patented Dec. 26, 1933

1,941,306

UNITED STATES PATENT OFFICE 1,941,306

FARM IMPLEMENT

Louis Hotto, East Carondelet, Ill.

Application April 5, 1933. Serial No. 664,615

1 Claim. (Cl. 97—8)

This invention relates in general to farming implements, and more particularly has reference to a cultivator or rake attachment for use in connection with a plow.

One of the objects of this invention is to provide an implement of the type described which may be attached to a plow of ordinary design, the frame of this attachment to be so arranged as to position the implement in offset relation with respect to the plow so that it will operate upon the furrow which the plow has already turned. It is also an object of this invention to provide an implement of this type for attachment to a plow in which the blades of the implement may be resiliently and at the same time adjustably held in contact with the ground by any desired amount of tension, in which several means are provided for permitting this resiliency, and in which adequate bracing means is provided for properly spacing the blades with respect to each other. It is an object of this invention that the blades of this attachment shall have their operative portions in alignment with the normal direction of movement of the implement, and further to provide an auxiliary blade for attachment to one of the end blades of this implement, whereby the path of the implement will be materially increased without necessity for increasing the size of the implement itself.

Other objects and advantages of this invention will become apparent from the following description taken in connection with the accompanying drawings, it being clearly understood that the same are by way of illustration and example only and are not to be taken as in any way limiting the spirit or scope of this invention. The spirit and scope of this invention is to be limited only by the prior art taken in connection with the accompanying claim.

Referring now more particularly to the drawings in which like numerals indicate corresponding parts throughout:

Figure 3 is a rear elevation showing a slightly modified form of blade assembly.

Figure 4 is a view taken along the line 4—4 of Figure 3.

Figure 5 is a detail view illustrating the bar upon which the blades of this invention are mounted.

Figure 6 is a view partly in section illustrating the method of securing this device in place upon the frame of a plow.

Figure 1:
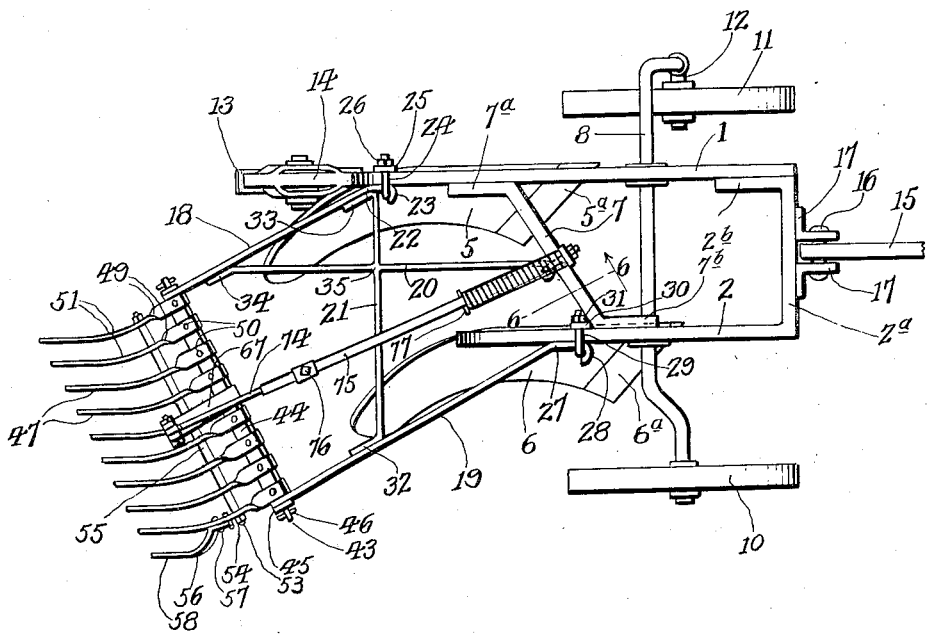
Figure 1 is a plan view illustrating the device selected for the purposes of illustrating this invention, the same being attached to a plow of conventional design.

This invention is intended to be applied to a plow of conventional design having longitudinal frame members 1 and 2 respectively, the rear ends of which are curved downwardly in the ordinary manner as at 3 and 4 respectively, and are provided with the plows 5 and 6 having points 5a and 6a respectively. As illustrated, the longitudinal frame member 1 is somewhat longer than the frame member 2, thereby providing for one of the plows 6 to be positioned somewhat in advance of the other plow 5.

At its forward end, the frame member 2 is bent transversely of the implement substantially at right angles to provide a cross frame member 2a, which is rearwardly bent to provide the portion 2b which is secured to the forward end of the frame member 1. There is also provided a cross member 7 adjacent the rear end of the frame member 2, the same being secured to the frame member 2 at 7b and to the frame member 1 at 7a.

Extending transversely of the frame just described, there is an axle shaft 8 mounted in the bearing portions 9 on the frame members 1 and 2, and carrying at its opposite ends the supporting wheels 10 and 11 respectively. As will be noted, the axle member 8 is offset downwardly at its ends which carry the wheels 10 and 11, and the end of the shaft which carries the wheel 11 is inwardly turned to form a bearing for this wheel as at 12 instead of being outwardly turned in the manner of the end which carries the wheel 10.

The rear end of the plow frame is supported by a small wheel 13 which is carried by the framework 14 supported by the rear end of the frame member 1.

The wheel 10 is adapted to bear along a previously made furrow, whereas the wheel 13 is adapted to follow the plow 5 in one of the newly made furrows. The wheel 11 is adapted to roll on top of the ground not yet plowed.

The entire plow mechanism is adapted to be drawn by means of a tongue 15 or the like pivoted by means of a pin 16 to the brackets 17 which are mounted on the cross member portion 2a of the frame.

The supporting frame for the attachment of this invention consists in general of a pair of side beams 18 and 19 respectively and a substantially cross-form-shaped brace formed of a pair of cross beams 20 and 21 respectively. At a point adjacent one end of the side beam 18, the same is angled as at 22, and the corresponding end of this beam is curved as at 23 for the purpose of receiving the U-bolt 24 for securing it to the frame member 1 of the plow. The U-bolt 24 is provided with the conventional cross bar 25 extending between its ends and with nuts 26 for holding the cross bar 25 in place and rigidly securing the side beam 18 to the frame member 1.

The side beam 19 is likewise angled at 27 and has its end curved at 28 to receive the U-bolt 29 which secures it to the frame member 2 of the plow. This U-bolt 29 is provided with its cross bar 30 and nuts 31 corresponding to the cross bar 25 and the nuts 26 on the U-bolt 24.

By virtue of the bent or angled portions 22 and 27 of the side beams 18 and 19 respectively, it will be seen that these beams will extend outwardly at an angle to the frame members 1 and 2 to which they are attached. This will obviously position their rear ends at points offset from the lines of the respective frame members 1 and 2 for a purpose to be later described.

The side beam 19 is rigidly maintained in its angular relation with respect to the frame members 1 and 2 as just described by means of a cross beam 21 which is joined to the beam 19 at a point 32 adjacent the outer end of the beam 19, and is joined to the beam 18 at a point 33 which is immediately adjacent the point where that beam is secured to the frame member 1. The frame member 18 is maintained in its proper angular relation to the frame member 1 by means of the cross beam 20 secured to the beam 18 at a point 34 adjacent the outer end thereof, and is secured at its inner end to the cross frame member 7 of the plow. These cross frame members 20 and 21 are preferably integrally joined together at their point of juncture 35 so as to form with the side beams 18 and 19 a rigid supporting frame structure.

The cross beam 20 is curled or bent at its end 36 for the purpose of receiving the U-bolts 37 adapted to secure it to the cross frame member 7 of the plow. This U-bolt is provided with a cross bar 38 and the nuts 39 for holding it in place. The cross bar 38 however has an upwardly extending part 40 provided with an opening therethrough for a purpose which will be presently described.

At their rear ends, the side beams 18 and 19 are curved downwardly and terminate in downwardly extending portions 41 and 42 each having an opening at its lower end which is aligned with the opening in the other for the purpose of pivotally mounting the pintles 43 on the opposite ends of the bar 44 which extends between the ends 41 and 42. The pintles 43 are prevented from being dislodged from the openings in the ends 41 and 42 by means of washers 45 which are held in place by means of pins or cotter keys 46 extending through the end of each pintle.

Figure 2:
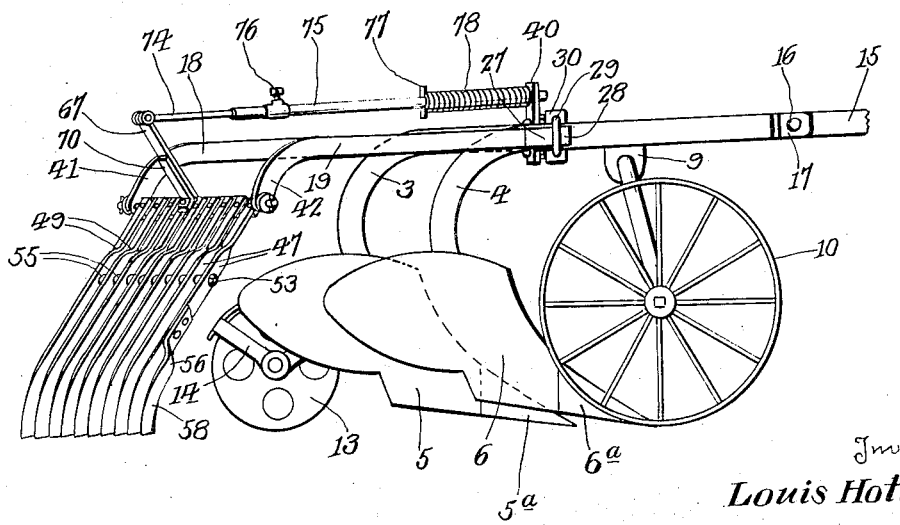
Figure 2 is a side elevation of the device illustrated in Figure 1.

Bolted or otherwise secured to the cross member 44 at points substantially equally spaced along its length are a plurality of flat primary blades, these blades being adapted to form the blades 47 of a rake as shown in Figures 1 and 2, or to form the blades 48 of the knife-type cultivator as shown in Figures 3 and 4.

With reference to Figures 1 and 2, the flat primary blades 47 are each twisted at a point 49 spaced a short distance from the pivoted support bar 44 so as to place their flat sides in planes substantially at right angles to this support bar. It will be recalled that these blades are secured with their flat sides in contact with the support bar 44 by bolts or other suitable means 50. It will also be recalled that the bar 44 as illustrated is pivoted on an axis which is at an acute angle to the normal direction of movement of the implement. This is for the purpose of offsetting the blades 47 or 48 as the case may be so that they will engage the earth which the plows 5 and 6 have turned and displaced just ahead of the blades. In order to prevent the blades from being dragged through the ground at an angle to one of their faces, each blade is curved intermediate its ends as at 51 so that its lower or opposite end will have its flat faces disposed substantially in line with the direction of movement of the implement.

For the purpose of properly spacing these blades from each other and preventing them from pivoting about their securing means 50, there is provided a reinforcing device consisting as illustrated in Figures 1 and 2 of a rod 53 threaded at each end to receive the nuts 54 for securing it in place. This rod extends through openings in each of the blades 47 just below the points 49 where they are twisted, and the blades themselves are spaced apart on this rod by means of sleeve members 55 which are carried by the rod 53 between each pair of blades.

It will readily be seen that the bending or curving of the blades 47 for the purpose of aligning the flat faces of their lower ends with the direction of movement of the implement will materially lessen the effective width or path taken in by the row of blades. For the purpose of increasing this width so that it might adequately cover the full width of the earth turned by both of the plows 5 and 6, there is secured to the outer primary blade 47 an auxiliary blade 56 by means of bolts or the like 57. This auxiliary blade 56 has a lower portion 58 which is formed of substantially the same contour as the lower ends of the primary blade, and serves the purpose of increasing the effective width of the device without the necessity of increasing the actual width of the frame, etc., upon which it is mounted. It is to be noted that in connection with Figures 1 and 2 the lower ends of the primary blades 47 and the auxiliary blade 58 are bent so as to extend substantially straight down thus forming a rake.

In connection with Figures 3 and 4, the construction is very similar, the blades 48 being secured to the pivoted bar 44 by means of bolts or the like 59, the flat faces of the blades 48 being in contact with the pivoted bar 44. These primary blades 48 are twisted at points 60 in substantially the same manner that the blades 47 are twisted at 49, except that the points 60 are preferably further removed from the support bar 44 than are the points 49.

The reinforcement for properly spacing the blades 48 apart is slightly different from that illustrated in connection with Figures 1 and 2, this reinforcement in this instance being in the form of a flat bar 61 which extends across the upper faces of the blades 48 at a position just above the points 60. This bar 61 is separately secured by suitable means such as the bolts 62 to each of the blades 48, thus spacing them apart in the proper manner and bracing them against undue movement with respect to each other.

The lower ends of the blades 48 are curved to place them in line with the intended direction of movement of the implement in much the same manner as the blades 47 are curved. An auxiliary blade 63 is provided corresponding to the auxiliary blade 56, and is secured to the outside blade 48 by rivets 64 or other suitable means. Unlike the blades 47, the blades 48 are at their lower ends curved rearwardly as illustrated at 65 in Figure 4, and are sharpened on their lower edges as shown at 66 in Figure 3. Thus this implement is capable of being used as a knife cultivator as well as a rake.

For the purpose of maintaining either the blades 47 or the blades 48 in proper contact with the ground, yet such contact that they may be forced upwardly when meeting with some unyielding object such as a stone or the like, a resilient arm 67 is secured to the bar 44 by means of the same bolt 68 which is used to secure the central blade 65 in place. As illustrated, the end of the resilient arm 67 which is secured to the bar 44 has an angled part 69 which abuts the under surface of this bar 44 and is secured thereto. A second resilient arm 70 is provided with an angled portion 71 abutting the upper surface of the central knife 47 or 48 as the case may be and extending outwardly along and forming a reinforcement for the resilient arm 67. It will be seen that both of these two arms extend substantially at right angles to the plane at which the blades extend from the bar 44.

At its outer end, the resilient arm 67 is formed with a looped portion 72 through which is inserted a bolt or the like 73 pivotally connecting the end of the rod 74 to the outer end of the resilient arm 67. As illustrated in Figures 1 and 2, this rod 74 is adapted to telescope within the hollow rod 75 and be adjustably secured within said hollow portion by means of a set screw 76. The opposite end of the rod 75 projects through the opening in the upper end 40 of the cross bar 38, and this rod carries a pin or other stop 77 at a point spaced from the cross bar 38. Between the cross bar 38 and the pin 77 there is inserted a compression spring 78, which it will be observed tends to constantly urge the rods 75 and 74 to the left as viewed in Figures 1 and 2, and thereby actuates the resilient arm 67 to resiliently urge the support bar 44 and the blades 47 or 48 in a direction to bring these blades into operative position.

From the above, it will be seen that first the supporting frame of this attachment is so constructed as to support the blade assemblage in the proper offset relation with respect to the plow, and at the same time to form a rigid and positive supporting frame therefor. It will further be seen that these blades have been curved so as to place them in proper alignment with the direction of movement of the implement, and that an auxiliary blade has been added in a very unique manner for the purpose of maintaining the full effective width of the blade assemblage in spite of the necessary curving to bring them into line with the direction of motion of the implement.

At the same time, it will be noted that a novel resilient arm has been employed actuated by the spring mechanism 78 for holding the blades in operative position, and that this mechanism may be adjusted as desired by means of the adjustable length rod composed of the members 74 and 75.

It will therefore be seen that a means has been provided for carrying out all of the objects of this invention in a novel and convenient manner.

What I claim is:—

In a cultivator attachment for a plow of that type including a frame structure having the side parts of the latter of unequal lengths and disposed in parallel spaced relation, the combination of a frame element disposed at an angle to and extended rearwardly from said structure, said element having parallel spaced side members of unequal lengths, means for detachably securing the forward end of the side member of shortest length directly against the inner face of the side part of greatest length rearwardly of the other side part, means for detachably securing the forward ends of the side member of greatest length to the outer face of the side part of shortest length forwardly of the forward end of the other side member, said side members having depending rear end portions, a bar inclined with respect to the direction of draft of the cultivator having its ends pivotally mounted in said portions, an inclined set of spaced downwardly extending primary cultivating blades torsionally twisted above their transverse medians and bent intermediate their ends to respectively dispose their lower ends parallel to the draft of the cultivator, in offset relation to their upper ends and with the effective width of said set being offset with respect to the auxiliary frame, said primary blades having their upper ends disposed flatwise against and anchored to said bar, the lower portions of said blades being curved to extend forwardly, an auxiliary cultivator blade secured to the outer blade at the forward end of the set and offset to be disposed in parallel spaced relation to said outer blade for forming a cultivating blade assembly of increased effective width substantially in alignment with said auxiliary frame without increasing the width of the latter, a vertical support carried by said structure centrally thereof, an upstanding rearwardly inclined element anchored at its lower end to the center of said bar, and a spring controlled rotating device pivotally connected at its rear end to said upstanding element and having its forward portion slidably mounted in said support.

LOUIS HOTTO.